United States Patent
Sun et al.

(10) Patent No.: US 10,055,816 B2
(45) Date of Patent: *Aug. 21, 2018

(54) TARGET-LESS AUTO-ALIGNMENT OF IMAGE SENSORS IN A MULTI-CAMERA SYSTEM

(71) Applicant: GoPro, Inc., San Mateo, CA (US)

(72) Inventors: Yajie Sun, Mountain View, CA (US); Timothy Macmillan, La Honda, CA (US); Elizabeth Torres Edwards, San Jose, CA (US); Sumit Chawla, San Carlos, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,951

(22) Filed: Sep. 21, 2017

(65) Prior Publication Data

US 2018/0025472 A1    Jan. 25, 2018

Related U.S. Application Data (63) Continuation of application No. 15/345,002, filed on Nov. 7, 2016, now Pat. No. 9,792,667, which is a
(Continued)

(51) Int. Cl.
*G06T 7/13* (2017.01)
*G06T 3/40* (2006.01)
(Continued)

(52) U.S. Cl.
CPC .......... *G06T 3/4038* (2013.01); *G06K 9/4604* (2013.01); *G06K 9/52* (2013.01);
(Continued)

(58) Field of Classification Search
CPC ........................................................ G06T 7/13
(Continued)

(56) References Cited

U.S. PATENT DOCUMENTS

| 5,115,477 A | 5/1992 | Groezinger |
| 5,563,723 A | 10/1996 | Beaulieu et al. |

(Continued)

FOREIGN PATENT DOCUMENTS

| CN | 101884222 | 11/2010 |
| CN | 102860016 | 1/2013 |

(Continued)

OTHER PUBLICATIONS

Extended European Search Report for European Patent Application No. EP 15765335.3, dated Feb. 1, 2017, 10 pages.
(Continued)

*Primary Examiner* — Paulos M Natnael
(74) *Attorney, Agent, or Firm* — Young Basile Hanlon & MacFarlane, P.C.

(57) ABSTRACT

A pair of cameras having an overlapping field of view is aligned based on images captured by image sensors of the pair of cameras. A pixel shift is identified between the images. Based on the identified pixel shift, a calibration is applied to one or both of the pair of cameras. To determine the pixel shift, the camera applies correlation methods including edge matching. Calibrating the pair of cameras may include adjusting a read window on an image sensor. The pixel shift can also be used to determine a time lag, which can be used to synchronize subsequent image captures.

17 Claims, 7 Drawing Sheets

Related U.S. Application Data continuation of application No. 14/876,041, filed on Oct. 6, 2015, now Pat. No. 9,521,318, which is a continuation of application No. 14/221,256, filed on Mar. 20, 2014, now Pat. No. 9,197,885.

(51) Int. Cl.

| | | |
|---|---|---|
| *H04N 17/00* | (2006.01) | |
| *G06K 9/52* | (2006.01) | |
| *G06K 9/62* | (2006.01) | |
| *G06T 5/00* | (2006.01) | |
| *G06T 7/33* | (2017.01) | |
| *G06T 7/80* | (2017.01) | |
| *H04N 5/232* | (2006.01) | |
| *H04N 5/349* | (2011.01) | |
| *H04N 5/374* | (2011.01) | |
| *H04N 13/02* | (2006.01) | |
| *G06K 9/46* | (2006.01) | |
| *H04N 13/239* | (2018.01) | |
| *H04N 13/246* | (2018.01) | |
| *H04N 13/271* | (2018.01) | |
| *H04N 13/296* | (2018.01) | |
| *H04N 13/00* | (2018.01) | |

(52) U.S. Cl.
CPC ............ *G06K 9/6201* (2013.01); *G06T 5/002* (2013.01); *G06T 7/13* (2017.01); *G06T 7/337* (2017.01); *G06T 7/80* (2017.01); *G06T 7/85* (2017.01); *H04N 5/2329* (2013.01); *H04N 5/23229* (2013.01); *H04N 5/349* (2013.01); *H04N 5/374* (2013.01); *H04N 13/0239* (2013.01); *H04N 13/0246* (2013.01); *H04N 13/0271* (2013.01); *H04N 13/0296* (2013.01); *H04N 13/239* (2018.05); *H04N 13/246* (2018.05); *H04N 13/271* (2018.05); *H04N 13/296* (2018.05); *H04N 17/002* (2013.01); *H04N 2013/0081* (2013.01)

(58) Field of Classification Search
USPC .......................................................... 348/47
See application file for complete search history.

(56) References Cited

U.S. PATENT DOCUMENTS

| | | | |
|---|---|---|---|
| 7,912,321 B1 | 3/2011 | Simonson | |
| 8,004,558 B2 | 8/2011 | Prechtl et al. | |
| 8,988,509 B1 * | 3/2015 | Macmillan | H04N 17/002 |
| | | | 348/47 |
| 9,197,885 B2 | 11/2015 | Sun et al. | |
| 9,325,917 B2 | 4/2016 | MacMillan et al. | |
| 2004/0246473 A1 | 12/2004 | Hermary et al. | |
| 2005/0123183 A1 | 6/2005 | Schleyer et al. | |
| 2005/0168650 A1 | 8/2005 | Walls et al. | |
| 2006/0012673 A1 | 1/2006 | Koselka et al. | |
| 2006/0045371 A1 | 3/2006 | Li | |
| 2007/0098290 A1 | 5/2007 | Wells | |
| 2007/0104389 A1 | 5/2007 | Wells | |
| 2008/0079814 A1 | 4/2008 | Nobuoka | |
| 2008/0219558 A1 | 9/2008 | Lu et al. | |
| 2010/0080487 A1 | 4/2010 | Yitzhaky et al. | |
| 2010/0097444 A1 | 4/2010 | Lablans | |
| 2011/0222757 A1 | 9/2011 | Yeatman et al. | |
| 2012/0081519 A1 | 4/2012 | Goma et al. | |
| 2012/0098925 A1 | 4/2012 | Dasher et al. | |
| 2013/0010084 A1 * | 1/2013 | Hatano | G03B 35/08 |
| | | | 348/47 |
| 2013/0010144 A1 | 1/2013 | Park | |
| 2013/0229497 A1 | 9/2013 | Delacoux | |
| 2015/0085150 A1 | 3/2015 | Silverstein | |
| 2015/0131784 A1 | 5/2015 | Tajima et al. | |
| 2015/0139398 A1 | 5/2015 | Tajima et al. | |
| 2015/0271421 A1 * | 9/2015 | MacMillan | H04N 17/002 |
| | | | 348/295 |
| 2015/0271483 A1 * | 9/2015 | Sun | H04N 17/002 |
| | | | 348/187 |
| 2016/0037063 A1 * | 2/2016 | Sun | H04N 17/002 |
| | | | 348/47 |
| 2016/0040984 A1 | 2/2016 | Byrne | |
| 2016/0205381 A1 * | 7/2016 | Macmillan | H04N 17/002 |
| | | | 348/47 |
| 2018/0025472 A1 * | 1/2018 | Sun | G06T 3/4038 |

FOREIGN PATENT DOCUMENTS

| | | |
|---|---|---|
| EP | 2500748 A2 | 9/2012 |
| JP | 2004032244 A1 | 1/2004 |

OTHER PUBLICATIONS

First Office Action for Chinese Patent Application No. CN 201580021229.6, dated Mar. 27, 2017, 11 pages.
Office Action for U.S. Appl. No. 15/077,911, dated Jun. 1, 2017, 7 pages.
Office Action for U.S. Appl. No. 14/876,041, dated Jun. 3, 2016, 12 pages.
Office Action for U.S. Appl. No. 14/606,019, dated Nov. 5, 2015, 7 pages.
Office Action for U.S. Appl. No. 14/221,256, dated Jul. 30, 2015, 10 pages.
PCT International Search Report and Written Opinion for PCT/US2015/011490, dated Jun. 10, 2015, 15 pages.
Office Action for U.S. Appl. No. 15/345,002, dated Apr. 3, 2017, 14 pages.
Office Action for U.S. Appl. No. 14/221,254, dated Jul. 10, 2014, 5 Pages.

* cited by examiner

TARGET-LESS AUTO-ALIGNMENT OF IMAGE SENSORS IN A MULTI-CAMERA SYSTEM

CROSS-REFERENCE TO RELATED APPLICATION

This application is a continuation of U.S. patent application Ser. No. 15/345,002, filed Nov. 7, 2016, now U.S. Pat. No. 9,792,667, which is a continuation of U.S. patent application Ser. No. 14/876,041, filed Oct. 6, 2015, now U.S. Pat. No. 9,521,318, which is a continuation of U.S. patent application Ser. No. 14/221,256, filed Mar. 20, 2014, now U.S. Pat. No. 9,197,885, all of which are hereby incorporated by reference in their entirety.

BACKGROUND

1. Field of Art

The disclosure generally relates to the field of digital cameras, and more particularly to capturing synchronized images from multiple cameras.

2. Description of the Related Art

Digital cameras capture images using an electronic image sensor. Example image sensors use CCD (charge-coupled device) or CMOS (complementary metal-oxide semiconductor) technology. A CMOS image sensor contains photodiodes corresponding to pixels of a captured image. In one configuration, the photodiodes are arranged in rows and columns. To capture an image, successive rows of photodiodes are exposed and read over time. The direction in which rows of photodiodes are exposed over time is the rolling shutter direction. For example, if an image sensor reads a row of photodiodes after reading the row of photodiodes above it, then the image sensor has a downward rolling shutter direction. Portions of the image along the rolling shutter direction are exposed at later times. When capturing an image of a scene in which an object is moving or when capturing an image in which the camera is moving relative to one or more objects within the image, objects may appear blurred if the object moves in an image frame relative to different image sensor rows exposed at different times. Similarly, duplicates of an object may appear (e.g., an image of a spinning airplane propeller captured with a CMOS sensor). Such image artifacts are referred to as "rolling shutter artifacts."

Three-dimensional (3D) images demonstrate depth information in a captured scene. One method for forming 3D images involves the combination of two or more two-dimensional (2D) images captured from different perspectives. An object's depth may be inferred based on the object's positions within the 2D images and based on the relative perspectives from which the 2D images were captured. When capturing a moving scene, the 2D images are taken simultaneously. Otherwise, capture objects moving relative to an image frame can appear at an incorrect depth in the resulting 3D image. When the rolling shutters of two cameras are misaligned, capturing the 2D images even simultaneously can result in rolling shutter artifacts and incorrect object depth determinations, as different portions of a scene are captured at different times. If the cameras do not capture the same portion of the scene at the same time, then any moving elements of the scene may appear blurred. To synchronize image capture, cameras containing the image sensors can be aligned along the direction of the rolling shutter using a six-axis pan-tilt camera mount, but aligning the cameras by this method is a time-consuming task, even for an experienced photographer.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In one embodiment, a computer-implemented process synchronizes a pair of image sensors. Images are captured with the pair of image sensors at substantially the same time. The image sensors have an overlapping field of view. A pixel shift is identified between the captured images based on captured image data representative of the overlapping field of view. A time lag is determined between the image sensors based on the identified pixel shift. The pair of image sensors is calibrated based on the determined time lag or the identified pixel shift to synchronize subsequent image capture by the image sensors.

In one embodiment, a computer-implemented process determines a pixel shift between a pair of images. A pair of images captured at substantially the same time is obtained. The images comprise image data representative of an overlapping field of view. One or more edges in the image data are identified. The one or more edges correspond to edges in a first image and a second image of the pair of images. The one or more identified edges from the first image are matched to the one or more identified edges in the second image. The pixel shift is determined between the pair of images based, at least in part, on the matching between the one or more edges.

It should be noted that although the examples described herein include the alignment of image sensors between two cameras, in practice, the principles described herein can apply to an array of any number of cameras. For instance, an average pixel shift or read window shift can be determined and applied to a linear array of three or more cameras in order to align the array of cameras. Further, a pixel shift or read window shift can be determined for both horizontally adjacent cameras, or for vertically adjacent cameras. For example, in a 2×2 camera array, images sensors can be aligned by determining a horizontal pixel shift or read window shift between a top pair of cameras and a bottom pair of cameras in the array, and by determining a vertical pixel shift or read window shift between a left pair of cameras and a right pair of cameras in the array.

Image Capture with a Pair of Cameras

Figure 1A:
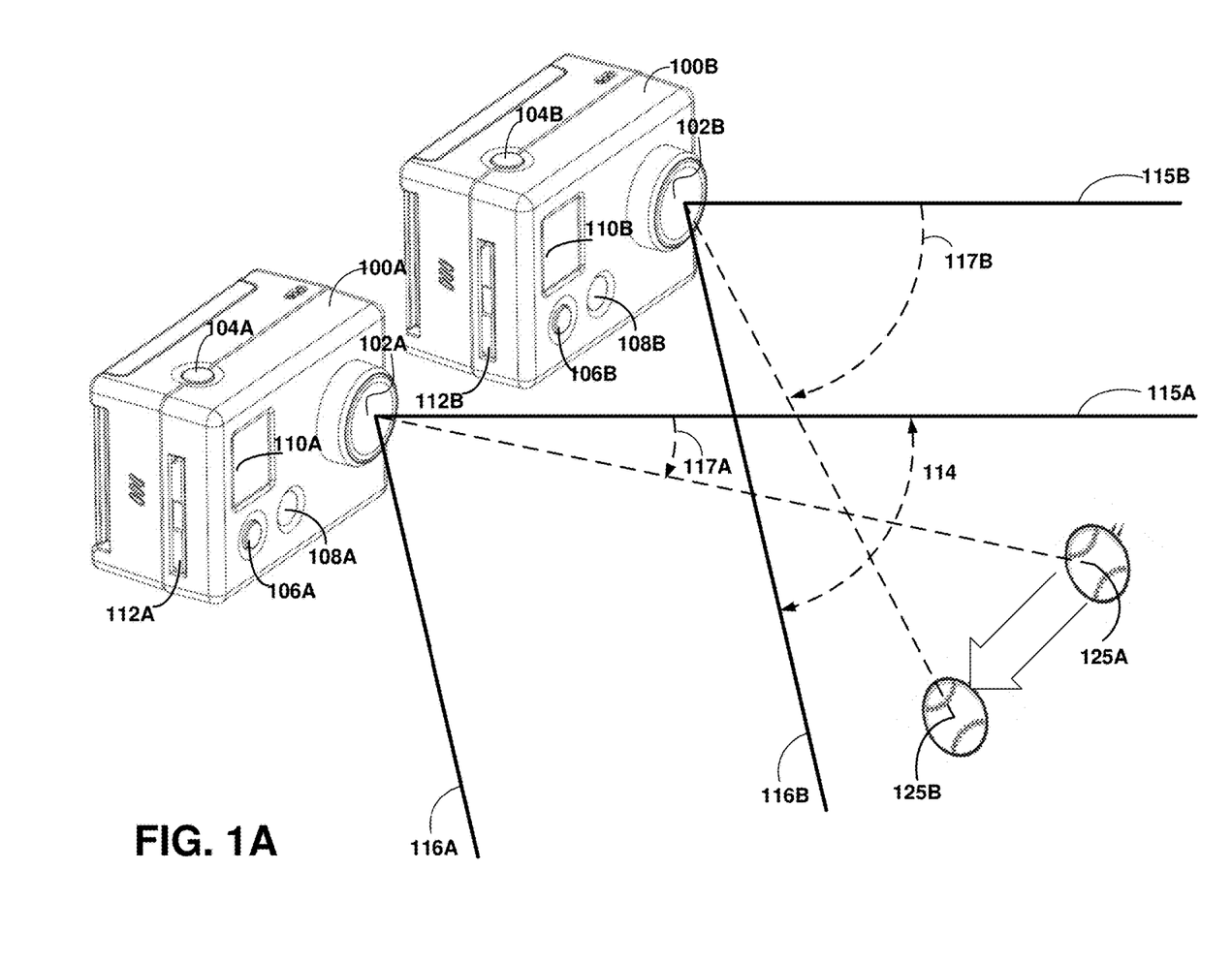
FIG. 1A illustrates an example pair of cameras configured with overlapping fields of view, according to one embodiment.

FIG. 1A illustrates an example pair of cameras configured with overlapping fields of view, according to one embodiment. In one embodiment, the adjacent cameras 100A and 100B belong to a camera pair and are configured to capture synchronized image data. The image data from the camera pair may be stitched together to form panoramic images or video, which may be two-dimensional (2D) or three-dimensional (3D).

As shown, each camera 100 includes a lens assembly 102, a shutter button 104, a function button 106, an indicator light 108, a control display screen 110, and a memory card slot 112 contained in a camera body. The body of the camera secures the components of camera. The lens assembly 102 includes one or more lenses and/or other optical components designed to focus, direct, converge and/or diverge light onto an internal image sensor (not illustrated in the embodiment of FIG. 1A). The lens assembly may include electrical and/or mechanical components to change the lens assembly's configuration (e.g., to modify the camera's focus and/or field of view).

Other conventional camera features not specifically illustrated or described may also be included in one or both cameras. For example, a camera 100 may include various optical components, an image sensor (e.g., a complementary metal oxide semiconductor (CMOS) sensor), a microphone, speakers, an image and/or audio processor, a controller, internal storage, an image preview display screen, input/output ports, a communications module, and/or other conventional components. A camera may include one or more components to secure the camera to a mount. In one embodiment, the cameras 100 are secured to a common mount. The mount may include a housing to encompass all or part of the cameras 100 in various positions and/or orientations.

In an alternative embodiment, the adjacent cameras 100A and 100B are combined into a single camera body having at least two lenses 102 and other components for capturing image data from at least two distinct perspectives. The cameras 100 may include different or additional control inputs than those illustrated in FIG. 1A for capturing images and/or videos, for viewing previously captured images and/or videos, or for managing various camera settings. The illustrated components may be omitted and/or modified without substantially inhibiting the functionality described herein.

Each camera 100 may have one of a variety of form factors. In one embodiment, each individual camera 100 in the camera system has a small form factor (e.g., a height of approximately 4 to 6 centimeters, a width of approximately 5 to 7 centimeters, and a depth of approximately 2 to 4 centimeters), and is lightweight (e.g., approximately 50 to 150 grams). Alternately or additionally, each camera 100 may have any suitable form factor configured to enable the functionalities as described herein.

In one embodiment, the cameras 100 may function independently. When optionally synchronized, multiple cameras can simultaneously capture video or still images in a time-synchronized manner. In one embodiment, the cameras communicate using a master/slave (or primary/secondary) configuration in which one camera operates as the master and one more additional cameras operate as slaves. In this configuration, the master camera sends various commands to the slave cameras. For example, the master camera may send a command that instructs the slave cameras to capture an image or begin recording video at a particular time (e.g., a predefined instance) or at a specific event (e.g., a specific event within the camera such as capture of a first frame of video or other image). Furthermore, the master camera may configure various settings of the slave cameras such as, for example, frame rate, exposure time, resolution, color, and/or any other operating parameters to ensure that the cameras record video or images using the same setting.

In one embodiment, either camera can be configured as either a master or slave (e.g., using a physical switch or a software setting). For video or image capture, the cameras 100 are time-synchronized to ensure that each of the synchronized cameras initializes frame capture at the same time. Furthermore, the cameras' clocks can be periodically re-synchronized in order to compensate for potential drift due to different internal camera clock characteristics. In one embodiment, captured images and/or videos are transmitted to a remote device for viewing. Alternatively or additionally, captured images and/or videos transmitted for display on one or more of the cameras 100 (e.g., displayed on a screen integrated with the camera body). A camera 100 may record and store its data locally, on a paired camera, and/or on an external device.

As shown in FIG. 1A, the cameras 100 can be similarly positioned such that the surfaces of their lenses 102 and top surfaces are substantially coplanar such that the cameras' line of sight is substantially parallel. In other example embodiments, the cameras 100 are rotated (e.g., towards or away from each other) in the plane formed by their top or side surfaces, such that the lens assembly 102 surfaces are not coplanar. The distance between lenses 102A and 102B may also differ depending on the desired application.

Each lens assembly 102 includes a corresponding field of view ("FOV") which denotes the physical space from which a camera 100 may capture image data. Although the FOVs are similar in size as illustrated in FIG. 1A, different FOVs may result when the lenses 102 or zoom settings differ between the cameras. The edges of camera 100A's FOV are denoted by FOV boundary lines 115A and 116A. Also shown is the rolling shutter direction 117A of camera 100A (from boundary line 115A to boundary line 116A). The edges of camera 100B's FOV (boundary lines 115B and 116B) are similarly shown along with its rolling shutter direction 117B.

As a result of the positions and orientations of cameras 100A and 100B, the fields of view overlap to form an overlap region 114, which is partially bounded by boundary lines 115A and 116B. As described above, if the cameras 100 are rotated towards each other or moved closer together, the FOV overlap region 114 increases, and if the cameras 100 are rotated away from each other or moved further apart, the overlap region 114 decreases. Image distortion at FOV boundaries 115 and 116 can result in various impracticalities for stitching collected image data. In practice, the actual size of the overlap region 114 may be altered based on the user's desired application or equipment qualities (e.g., distortion from the lens assembly 102, the alignment of the camera housing, the camera body, the lens assembly 102, and the image sensor). In either instance, rolling shutter artifacts may occur within the overlap region 114.

To demonstrate an example circumstance producing a rolling shutter artifact, FIG. 1A illustrates an object 125 (e.g., a baseball) moving along a path within the overlap region 114 during image capture. The object 125 is shown at a first position 125A and second position 125B. The first position 125A corresponds to a first time, t1, when the rolling shutter of camera 100A captures the object 125. The second position 125B corresponds to a second time, t2, when the camera 100B captures the object 125. As shown, the rolling shutter 117A of camera 100A encounters the object 125 at an earlier position and time than the rolling shutter of camera 100B. In other words, camera 100A "sees" or captures an image of the object 125 before camera 100B. Thus, cameras 100A and 100B capture image data of the object 120 at two different positions. If the cameras were intended to capture an image in synchronization, then the images contain a rolling shutter artifact, which is the discrepancy in the position of the object 125.

Oftentimes, these rolling shutter artifacts create significant problems during post-processing. For example, when images from the cameras 100A and 100B are combined to stitched together to create a 2D image encompassing the FOVs of both cameras, the object 125 is shown in different positions. The combined image may show two instances of object 125, which may overlap with each other depending on the magnitude of the position discrepancy. The multiple instances of object 125 may interfere with aligning the respective FOVs of cameras 100A and 100B as well.

As another example, the images from cameras 100A and 100B are combined to create a 3D image encompassing the overlap region 114. Cameras 100A and 100B capture images from different perspectives, so the position of object 125 appears different between the two images due to parallax. This shift due to parallax may be used to infer the depth of the object 125 from a plane containing the lenses 102. The depth of the object 125 is inversely proportional to the apparent positional shift of that object (parallel to the axis between the lens apertures of cameras 100A and 100B). Parallax assumes that the object 125 is at the same position in both images. If object 125 has moved along the axis parallel to the line between the lens apertures, then the object's apparent shift in the image data contains a shift component due to the object's movement and a shift component due to parallax. Due to the shift component from the object's movement, the apparent depth calculated from the apparent shift of the object 125 is inaccurate. 3D images resulting from images containing a moving object captured at different times thus can contain objects at incorrect depths.

The cameras illustrated show one example configuration for producing 2D and/or 3D images using image data from multiple perspectives. Other example configurations of cameras include cameras placed around a central point and pointed substantially opposite the central point (e.g., four cameras aligned to provide a 360-degree field of view around an axis, six cameras aligned to provide a spherical field of view, and the like). The image sensors may be arranged linearly or as part of an array (e.g., an array of four coplanar cameras arranged in two rows and two columns). The cameras may be distributed and pointed towards a central point. The disclosed techniques for aligning image sensors may be used for any pair of cameras with an at least partially overlapping field of view.

Alignment Along the Rolling Shutter Direction

Figure 1B:
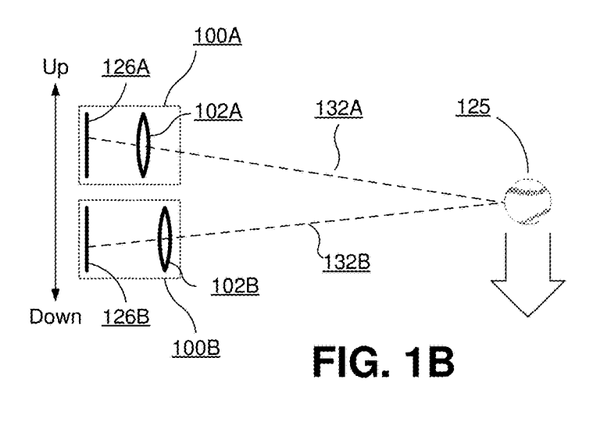
FIGS. 1B and 1C illustrate two cameras arranged in example configurations to capture an image, according to one embodiment.
Figure 1C:
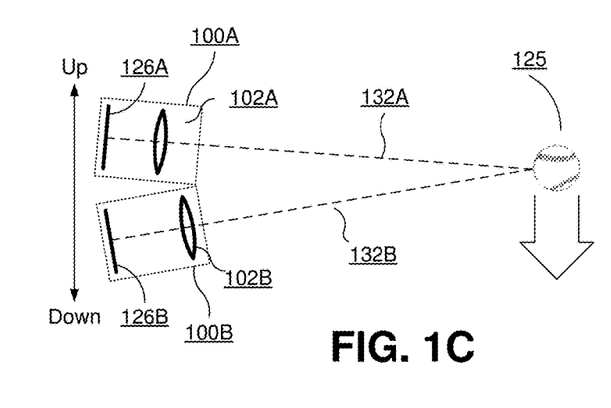

Turning to FIGS. 1B and 1C, illustrated are two cameras arranged in example configurations to capture an image according to one embodiment. Two cameras 100 are illustrated showing a lens assembly 102 and an internal image sensor 126. Camera 100A is positioned above camera 100B, and the cameras are configured to capture images of the object 125, which is moving downwards. The cameras 100, object 125, and the distance between them are not shown to scale. The lines of sight 132 demonstrate the path taken by light from the object 125 to the image sensors 126. When a camera 100 captures an image, light from the object 125 enters the camera through the lens assembly 102 and falls incident upon on the image sensor 126. The object's apparent position in the captured image depends on the location of the image sensor 126 on which the light from the object 125 is incident, as shown by line of sight 132.

As manufactured or assembled, the relative positions and/or orientations of a first camera's body and lens assembly within the camera body may differ from the relative positions and/or orientations of a second camera's body and lens assembly within the camera body, even if the cameras are manufactured to be identical. The example camera 100A, for example, has a smaller distance between the lens assembly 102A and image sensor 126A than camera 100B has between the lens assembly 102B and image sensor 126B. These differences in position and/or orientation may change depending on the location of the image sensor 126 on which the line of sight 132 is incident. Accordingly, these differences may change an object's apparent position within a captured image. Additionally, the assembly and/or manufacture of the components of the lens assembly 102 may cause additional deviations in the line of sight between the image sensor 126 and the object 125. For example, the relative position of components in the optical assembly, the alignment of a lens mount relative to the optical assembly, the alignment of the lens mount relative to the camera body, the alignment of the image sensor 126 relative to the camera body, or the alignment of the camera body relative to an attached camera mount may contribute to misalignment. These deviations in alignment may change the object's apparent position between a pair of captured images.

Figure 1D:
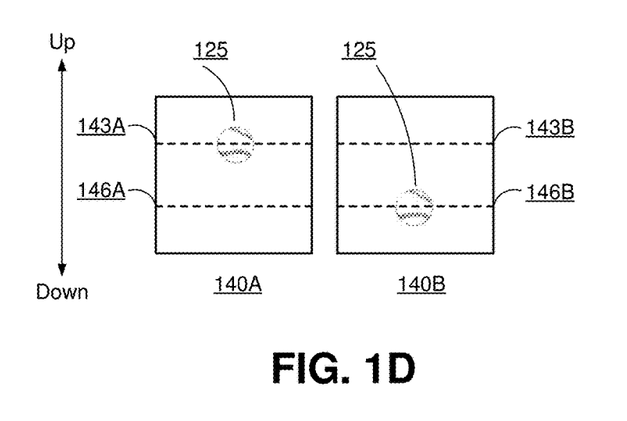
FIG. 1D illustrates example images taken by a pair of cameras with misaligned rolling shutters, according to one embodiment

In FIG. 1B, cameras 100A and 100B are configured so that the lines of sight 132 result in different object positions on the respective image sensors 126. This occurs, at least in part, because of the different distances between the respective lens assemblies 102 and image sensors 126. FIG. 1D illustrates example images 140 taken by the cameras 100 with misaligned rolling shutters, consistent with the embodiment of FIG. 1B. Images 140A and 140B correspond to the images taken by cameras 100A and 100B, respectively, in the configuration illustrated in FIG. 1B. The images contain pixel rows 143 and 146. In image 140A, object 125 is captured at pixel row 143A, and in image 140B, object 125 is captured at pixel row 146B. In an example image having 3000 pixels in the vertical direction, the shift between pixel row 143 and 146 is about 100 pixels. This rolling shutter artifact is due to the difference in lens positions between cameras 100A and 100B. In FIG. 1C, cameras 100A and 100B are configured so that the lines of sight 132 result in substantially similar object positions on the image sensors 126 even though the lens assemblies 102 have different positions from the respective images sensors 126.

Misalignments along the direction of the rolling shutter cause rolling shutter artifacts when capturing a moving object. For example, suppose the cameras 100 have a downward rolling shutter direction and begin capturing the image at the same time. The rolling shutter captures pixel row 143 at an earlier time than it captures pixel row 146. Since the object 125 is moving, images 140A and 140B capture the object at different positions in space. If images 140A and 140B are combined, the resulting image will have a rolling shutter artifact.

Camera Architecture

Figure 2:
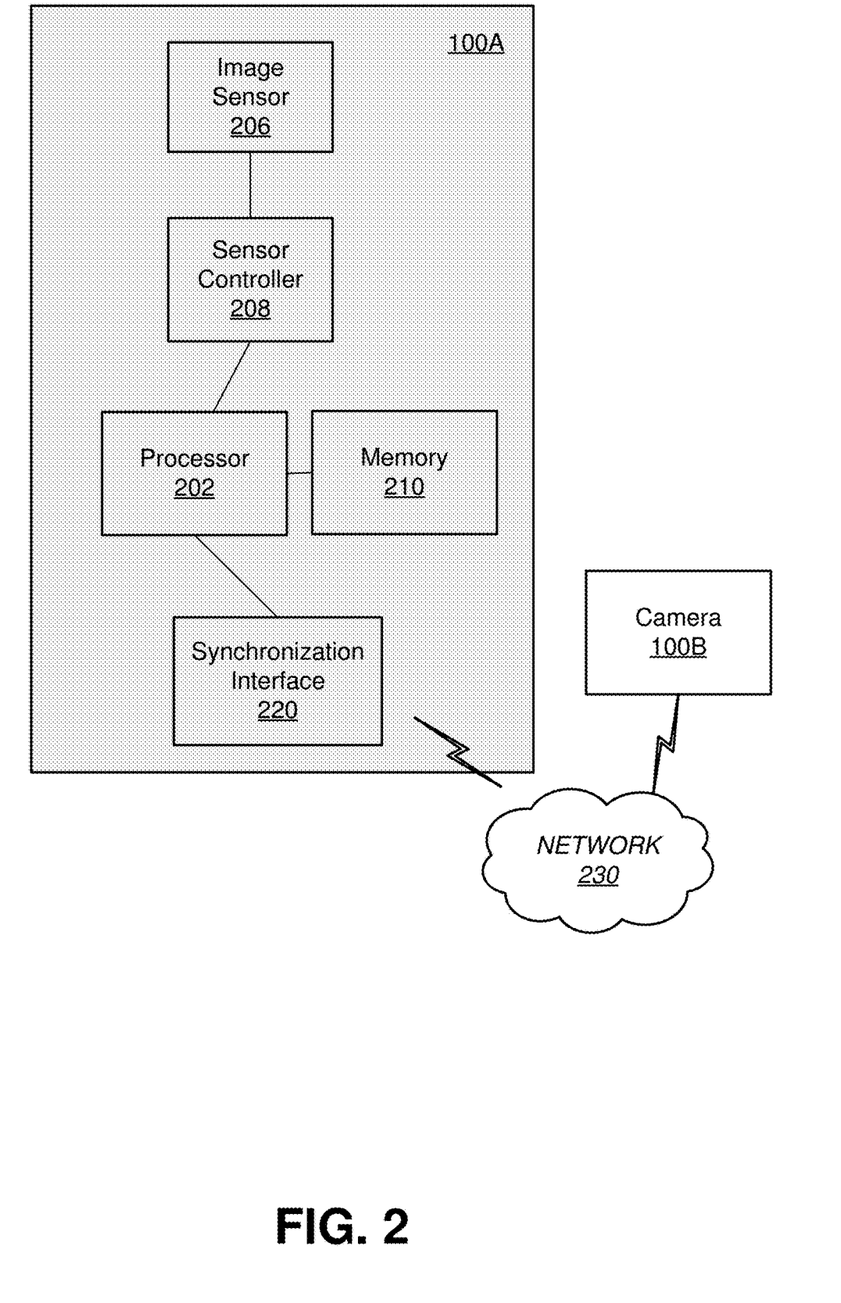
FIG. 2 illustrates an example architecture for each of a pair of cameras, according to one embodiment.

FIG. 2 illustrates an example architecture for each of a pair of cameras 100A and 100B, according to one embodiment. Camera 100A includes an image sensor 206, a sensor controller 208, a processor 202, a memory 210, and a synchronization interface 220. Camera 100A is communicatively coupled to camera 100B over network 230. In one embodiment, camera 100B contains similar components to camera 100B. Although two cameras 100 are illustrated, additional cameras may be present. Alternatively or additionally, the cameras 100 are communicatively coupled over of the network 230 to a computing device (not illustrated in FIG. 2) that performs at least some functions of the processor 202 and/or memory 210. Alternatively or additionally, the components of cameras 100A and 100B are combined in a common camera body. For example, the combined camera may have two or more image sensors 206 that share a common processor 202, memory 210, or synchronization interface 220. It should be noted that in other embodiments, the cameras 100 can include additional or different components than those illustrated in the embodiment of FIG. 2.

The image sensor 206 is a device capable of electronically capturing light incident on the image sensor 206. In one embodiment, CMOS sensors are used, including transistors, photodiodes, amplifiers, analog-to-digital converters, and power supplies. In one embodiment, the image sensor 206 has a rolling shutter direction. The image sensor 206 can capture the portions of the image at substantially at the same time (e.g., using a CCD sensor). In one embodiment, the image sensor 206 has an adjustable read window. An adjustable read window modifies the portions of the image sensor that are exposed to light and read to capture an image. By adjusting the read window, the camera 100A can modify when a portion of an image is captured relative to when image capture begins. For example, by shifting the read window in the rolling shutter direction, the image sensor captures portions of the image in the read window earlier than if the read window was not shifted in the rolling shutter direction.

The processor 202 is one or more hardware devices (e.g., a central processing unit (CPU), a graphics processing unit (GPU), a digital signal processor (DSP), and the like) that execute computer-readable instructions stored in the memory 210. The processor 202 controls other components of the camera based on the instructions that are executed. For example, the processor 202 may send electronic control signals to the image sensor 206 or use the synchronization interface 220 to send data over the network 230 to camera 100B or some other connected device.

The memory 210 is a non-transitory storage medium that can be read by the processor 208. The memory 210 may contain volatile memory (e.g., random access memory (RAM)), non-volatile memory (e.g., a flash memory, hard disk, and the like), or a combination thereof. The memory 210 may store image data captured by the image sensor 206 and computer-readable instructions to be executed by the processor 202.

The sensor controller 208 controls operation of the image sensor 206 and other functions of the camera 100A. The sensor controller 208 can include physical and/or electronic input devices, such as exterior buttons to start recording video and/or capture a still image, a touchscreen with tap-to-focus capabilities, and a dial/button combination for navigating a menu hierarchy of the camera 202. In addition, the sensor controller 208 may include remote user input devices, such as remote controls that wirelessly communicate with the cameras 100A. The image sensor 206 may function independently of the sensor controller 208. For example, a slave camera in a master-slave pairing can receive a signal to capture an image through the synchronization interface 220.

The synchronization interface 220 sends and receives data over the network 230 to communicate with other devices, such as camera 100B, other cameras, or an external computing system. In particular, the synchronization interface 220 may send or receive commands to one or more cameras for simultaneously capturing an image and/or calibrating synchronization with other cameras (e.g., sending or receiving a synchronization pulse). The synchronization interface 220 may be used to transfer image data to another camera system for use in calibration.

The network 230 communicatively couples the cameras 100 and other components not illustrated in the embodiment of FIG. 2, and allows coupled devices, including the cameras 100, to exchange data with each other over local-area or wide-area networks. The network 230 may contain a combination of wired or wireless technology and make use of various connection standards and protocols, such as USB (universal serial bus), IEEE 1394, Ethernet, 802.11, or Bluetooth. The network 230 may also use the internet to exchange data between connected devices and may contain link technologies such as CDMA (code division multiple access), 3G, 4G, or another wireless local-area network. Alternatively or additionally, the network 230 and the network synchronization interface are omitted and image and/or calibration data is transferred between the cameras 100 using a non-transitory computer-readable medium (e.g., a removable flash memory card).

Image Sensor Synchronization

Figure 3:
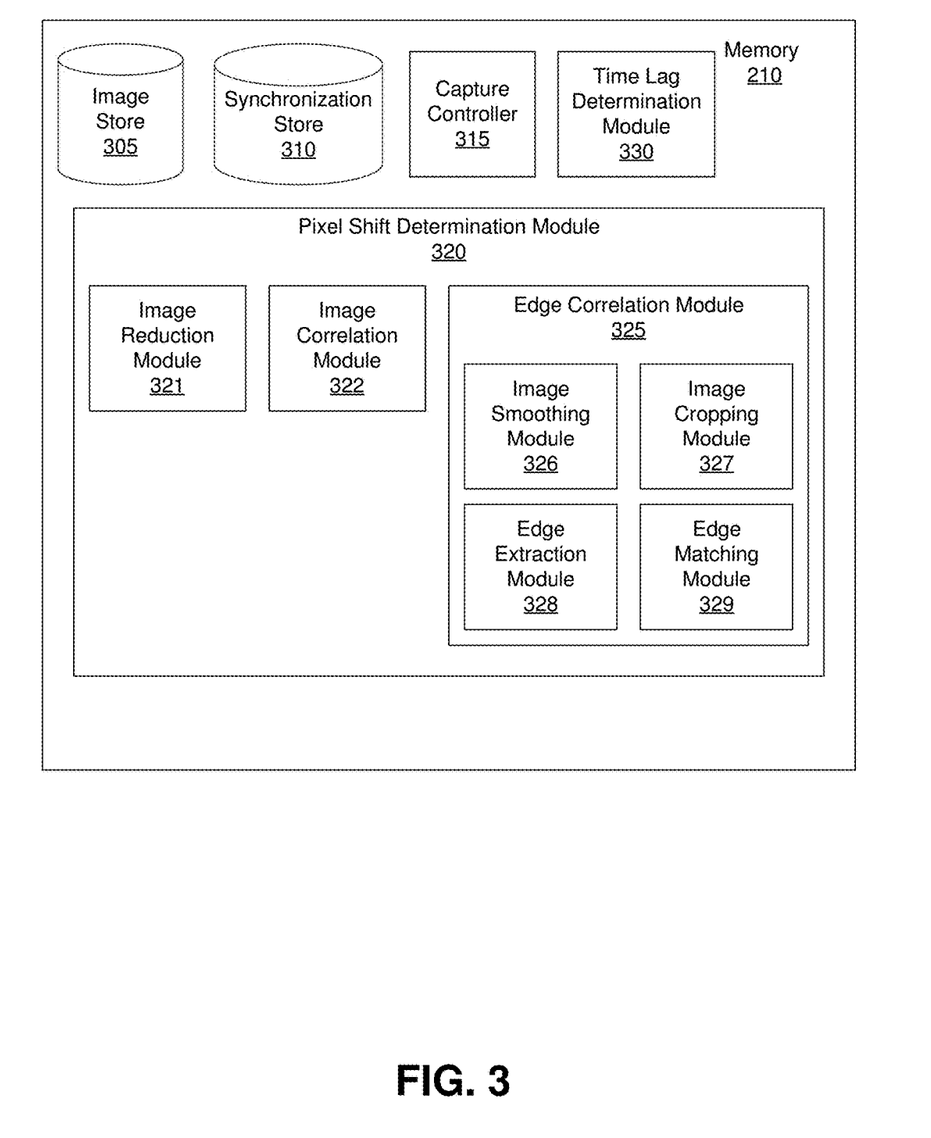
FIG. 3 illustrates an example high-level block diagram of a system for synchronizing a pair of image sensors, according to one embodiment.

FIG. 3 illustrates an example high-level block diagram of a system for synchronizing a pair of image sensors, according to one embodiment. The system includes modules stored on memory 210 including an image store 305, a synchronization store 310, a capture controller 315, a pixel shift determination module 320, and a time lag determination module 330. Alternate embodiments may have one or more additional, omitted, or alternative modules configured to perform similar functionality. It should be noted that in other embodiments, the modules described herein can be implemented in hardware, firmware, or a combination of hardware, firmware, and software. In addition, in some embodiments, a first camera in a pair includes the components illustrated in FIG. 3, while a second camera does not necessarily include the components of FIG. 3, but instead merely synchronously captures an image with the first camera and provides the captured image to the first camera for processing. As used herein, a "pair of images" refers to two images captured synchronously by a pair of cameras with an overlapping FOV. Alternatively or additionally, an external computing device processes image data captured by the camera pair.

The image store 305 is configured to store a pair of images synchronously captured by each of a pair of cameras. The synchronization store 310 is configured to store camera synchronization data. Examples of synchronization data include time lags between cameras due to network lag or internal component lag (e.g., lag from the synchronization interface 220, the processor 202, the sensor controller 208, and the like). The synchronization store 310 is configured to store calibration settings such as read window shift information and a calibrated time lag for initiating image capture.

The capture controller 315 controls image capture by the image sensor 206. In one embodiment, the capture controller 315 applies a calibration correction to synchronize image capture with one or more additional cameras. The calibration correction may include a read window shift by a determined number of pixels, as determined by the pixel shift determination module 320. The calibration correction may include, alternatively or additionally, a time lag for one of the cameras in the pair to delay relative to the other camera of the pair before beginning image capture, as determined by the time lag determination module 330.

The pixel shift determination module 320 identifies a pixel shift between an image captured by a first camera and an image captured by a second camera. This pixel shift indicates spatial misalignment between the image sensors of the cameras. In one embodiment, the pixel shift determination module 320 determines a pixel shift in the rolling shutter direction due to a misalignment between the image sensors along the rolling shutter direction. The capture controller 315 can use the determined pixel shift to correct the misalignment between the image sensors. Pixel shift determination is described in greater detail below.

The time lag determination module 330 determines a time lag between the capture of an image row by a first camera and corresponding image row of a second camera. The time lag determination module 330 can determine a time lag based on a pixel shift received from the pixel shift determination module 320. Using the determined time lag, $t_{lag}$, the capture controller 315 synchronizes the pair of cameras by delaying image capture of a first of the pair by the time lag relative to a second of the pair. In one embodiment, an image sensor has an associated row time, $t_{row}$, which represents an elapsed time between exposing a first pixel row and a second, subsequent pixel row. If images taken by a camera pair are determined to have a pixel shift of n pixels, then the time lag $t_{lag}$ required to correct the pixel shift can be determined using the following equation:

$$t_{lag} = t_{row} \times n$$

In one embodiment, calibrating image capture between cameras in a pair involves synchronously capturing images with the camera pair, determining a pixel shift between the captured images, and applying a determined correction iteratively until the determined pixel shift is less than a pre-determined pixel shift threshold. The calibration process may be initiated when cameras are powered on or paired, or a user may manually initiate the calibration process. A master camera can initiate the calibration process when a time elapsed since the last calibration is greater than or equal to a pre-determined threshold. In an embodiment with additional cameras, additional calibrations can be performed among cameras having a common FOV.

Pixel Shift Determination

The pixel shift determination module 320 identifies a shift in pixels between a pair of images, and includes an image reduction module 321, an image correlation module 322, and an edge correlation module 325, which in turn includes an image smoothing module 326, an image cropping module 327, an edge extraction module 328, and an edge matching module 329. It should be noted that the modules described in the embodiment of FIG. 3 are just one means of implementing the functions described herein, and in some embodiments, different or additional modules perform similar or additional functions. In addition, in some embodiments, certain functions are not performed. For example, in correlating edges between a pair of images, the edge correlation module 325 may not smooth the images or crop the images using the image smoothing module 326 and the image cropping module 327, respectively.

The image reduction module 321 receives a pair of images and produces reduced image data for the pair of images, for instance by reducing an amount of image data from each captured image, from a portion of each image, from compressed image data representative of each image, and the like. In some embodiments, the image reduction module 321 reduces image data by removing or compressing portions of image data that are less useful in identifying a pixel shift (e.g., image portions of uniform color, uniform texture, and the like). By reducing image data, the image reduction module 321 can reduce the computational load required to determine a pixel shift between a pair of images.

The reduced image data can be used by the pixel shift determination module 320 to determine a pixel shift between an image pair, or can be transmitted to another device for use in a pixel shift determination. In one embodiment, the image reduction module 321 selects a portion a pair of images representative of a common FOV of the pair of images and reduces image data of the pair of images within the common FOV, external to the common FOV, or both. In some embodiments, the location of a common FOV between an image pair is known, while in others, a common FOV can be identified by analyzing the image pair to identify portions of each image in the pair that are substantially similar. The image compression module 321 may use known camera configuration characteristics (e.g., an angular width of the field of view, the orientation of the cameras, or the relative position of the cameras) to identify portions of the image corresponding to an overlapping FOV.

The image reduction module 321 can apply one or more algorithms to compress image data of a pair of images to reduce the image data of the pair of images. In one embodiment, the image reduction module 321 compresses pixels in a direction perpendicular to the rolling shutter direction of a pair of images to reduce image information, while maintaining image information along the direction of the rolling shutter. In one embodiment, the image reduction module downsamples image data of the pair of images to reduce image data, further decreasing the computational time required by the pixel shift determination module 320. The image can be downsampled by a downsampling rate, which reduces the total number of pixels along a row or column of pixels by a corresponding downsampling factor. It should be noted that in some embodiments not described further herein, the pixel shift determination module 320 determines a pixel shift between a pair of images without reducing the image data of a pair of captured images.

The image correlation module 322 receives reduced image data for the pair of images and determines a pixel shift between the pair of images from the reduced image data. In one embodiment, the image correlation module 322 uses a cross-correlation algorithm to identify a pixel shift based on the reduced image data for the pair of images. In this embodiment, a cross-correlation coefficient is calculated for the reduced image data of the pair of images for each of a plurality of possible pixel shifts along one or more dimensions of the image data. The image correlation module 322 can determine the pixel shift between the pair of images as the pixel shift that results in the highest cross-correlation coefficient. The image correlation module 322 may calculate a cross-correlation coefficient for all possible pixel shifts or may use one or more correlation optimization methods to search for a pixel shift that maximizes a cross-correlation coefficient while reducing or substantially minimizing the computational load required to identify a pixel shift between an image pair. The image correlation module 322 can determine image vectors between features of each of the pair of images for use in determining a pixel shift. For example, the image correlation module 322 can identify features of the image data such as corners (e.g., using the Harris and Stephens corner detection algorithm or the Förstner corner detector) or blobs (e.g., using a Laplacian analysis or by determining a difference between Gaussians curves representative of the images). Vectors between corresponding image features can then be determined (e.g., using a correlation algorithm) to determine a pixel shift. It should be noted that in embodiments where the pixel shift determination module 320 does not reduce image data, the image correlation module can identify a pixel shift between the original pair of images using the methods described herein.

The edge correlation module 325 detects one or more edges in a pair of images or in reduced image data associated with a pair of images, and correlates the detected edges to determine a pixel shift. In the embodiment of FIG. 3, the edge correlation module 325 includes an image smoothing module 326, an image cropping module 327, an edge extraction module 328, and an edge matching module 329 for use in correlating edges to determine a pixel shift. The edge correlation module 325 can use Canny edge detection or differential edge detection to identify edges in the image pair. In some embodiments, the edge correlation module 325 identifies edges using luma and/or chroma information from a pair of images in the YUV color space. In such embodiments, the edge correlation module 325 identifies image regions to search for edges based on chroma data of the image pair, and detects edges within the identified regions using luma data of the image pair. In some embodiments, the edge correlation module 325 multiplies a derivative of a chroma component of an image by a derivative of a luma component of the image to detect edges within the image. In such embodiments, edges can be identified based on pixel locations associated with an above-threshold product of such derivatives.

The image smoothing module 326 removes artifacts and other irregularities from the image pair or from reduced image data associated with the image pair, producing smoothed images. In one embodiment, Gaussian filters are used to identify edges and to remove image artifacts that are determined to not be edges. For example, a small Gaussian filter can be used to detect fainter, less obvious edges, and a large Gaussian filter can be used to detect more prominent edges. In such an example, the image smoothing module 326 can remove artifacts not detected as edges by either filter. The image smoothing module 326 may also downsample an image pair to reduce processing time and/or to smooth the image pair.

The image cropping module 327 removes portions of the smoothed pair of images to produce a pair of cropped images for use in detecting edges within the images. Alternatively or additionally, the image cropping module 327 removes portions of reduced image data to produce a pair of cropped and reduced image data. In one embodiment, the edge correlation module 325 identifies straight-line edges perpendicular to the rolling shutter direction. Some lenses create a fisheye effect in captured images, which distorts straight lines. This fisheye effect is more pronounced around the edges of an image. To reduce or remove a fisheye effect in captured images, the image cropping module 327 crops the images by removing image data from the outer borders of the image to reduce such warping of straight-line edges.

The edge extraction module 328 identifies edges in the pair of cropped images or in reduced image data associated with the pair of cropped images, for instance using any of the techniques described herein, and extracts edge information representative of the edges of the pair of images. In one embodiment, the edge extraction module 328 extracts edge magnitude and edge phase for each detected edge in the pair of images. To calculate edge magnitude and phase, first derivatives are taken for the cropped image pair along the rows and columns of pixels. For example, the edge extraction module 328 can take the first derivative of image luma data, image chroma data, red/green/blue data, black and white data, or any other data representative of the image pair. The edge magnitude is computed based on a square root of the squared sums of the first derivatives of the cropped image pair along the row and column directions. The edge phase is computed based on an inverse tangent of the ratio of the first derivatives of the cropped image pair along the row and column directions. The edge phase corresponds to an edge's orientation, and the edge magnitude corresponds to an edge's sharpness. It should be noted that in other embodiments, the edge extraction module 328 extracts edge information other than edge magnitude and phase information.

In one embodiment, the edge extraction module 328 identifies substantially straight edges having a direction substantially perpendicular to the rolling shutter direction. For example, if the rolling shutter direction is vertical, the edge extraction module 328 identifies horizontal edges. The edge extraction module 328 can identify pixels in an identified edge as a component of the edge if the determined edge magnitude is greater than or equal to a magnitude threshold, and if a difference between the determined edge phase and a target edge phase is within an edge threshold value. In one embodiment, the edge extraction module 328 determines a length of each identified edge, and discards edges having a length smaller than a length threshold.

The edge matching module 329 accesses the edge information representative of the edges in the pair of images (or the reduced data associated therewith) and determines a pixel shift based on the edge information. In one embodiment, the edge matching module 329 characterizes edges represented by the edge information by their length, their magnitude, their phase, or their position along the axis of the rolling shutter. In one embodiment, the edge matching module 329 recursively matches edges based at least in part on edge length and/or edge magnitude. As used herein, "matching edges" refers to the alignment of corresponding edges in the pair of images. To recursively match edges, an edge from a first image is compared against edges from a second image until a match occurs within an edge length difference threshold and/or an edge magnitude difference threshold. The edge matching module 329 can determine a pixel shift between the pair of images that maximizes the number of matched edges or maximizes a correlation score representative of the alignment between corresponding edges. The edge matching module 329 may score possible pixel shifts on the basis of correlation between edges in the image pair, or may use a directed search based on matching the longest edges within the image pair. It should be noted that if the image reduction module 321 downsampled the pair of images by a downsampling factor before the edge correlation module 325 accesses the pair of images to determine a pixel shift, then the pixel shift determined by the edge correlation module should be multiplied by the downsampling factor prior to using the pixel shift to align image sensors.

Image Sensor Alignment

Figure 4A:
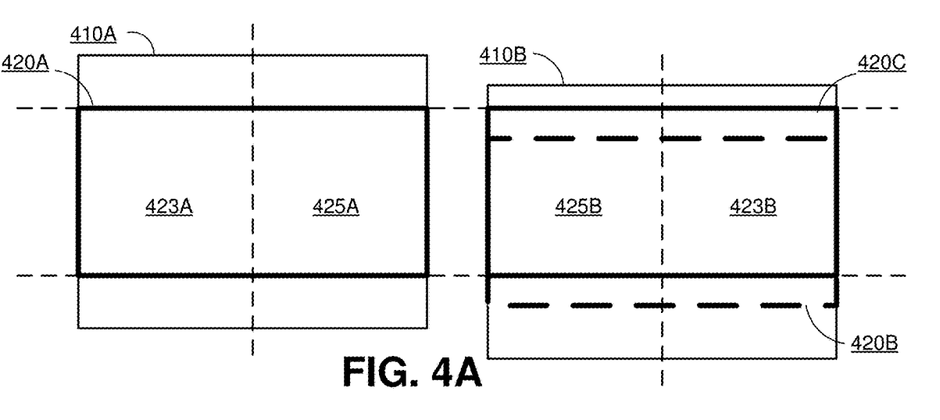
FIG. 4A illustrates the alignment of an example pair of image sensors by shifting the read window on an image sensor of the pair, according to one embodiment.

FIG. 4A illustrates the alignment of an example pair of image sensors by shifting the read window on an image sensor of the pair, according to one embodiment. Example image sensors 410A and 410B are taken by cameras having a different alignment in the rolling shutter direction. Each image sensor 410 includes a read window 420, which indicates the pixels in the image sensor 410 that are exposed to light and read out by the corresponding camera. In the illustrated example, the image sensors 410 capture image data from the top row of pixels of the read window 420 to the bottom row of pixels of the read window 420. The image sensors 410 capture light incident from a partially overlapping FOV, including the overlap region 425. The image sensors 410 also capture light incident from non-overlapping FOVs, including the regions 423A and 423B.

In the illustrated example, the read windows 420 are adjusted to synchronize image capture by an amount of pixels substantially equivalent to a determined pixel shift (for instance, from the pixel shift determination module 320). As aligned, image sensor 410A captures light incident from a higher FOV relative to the image sensor 410B. The read windows 420A and 420B illustrate the initial position of the read windows prior to adjustment. Due to the read window alignment, the image sensor 410A captures a row of pixels at an earlier time than a corresponding row of pixels having a similar height in image sensor 410B. In other words, the read window 420B is positioned below the read window 420A, resulting in a misalignment between the image sensors. Since the image sensors 410 begin capturing images at the top of the read window, shifting the read window 410B upwards by the determined pixel shift can synchronize the time of image capture of corresponding rows of pixels between the image sensors. The capture controller 315 shifts the initial read window 420B to the position of the aligned read window 420C (as shown). When images are captured, corresponding pixel rows from images captured by the image sensors 410 contain image data captured at substantially the same time, and can be stitched together to construct a 2D image. In addition, after shifting a read window by a determined pixel shift, the image regions 425A and 425B represent the same FOV, and can be used to construct a 3D image.

Figure 4B:
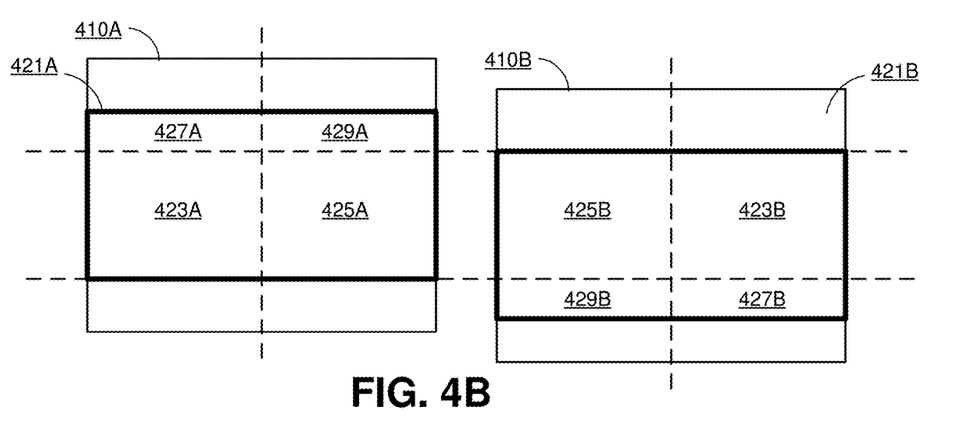
FIG. 4B illustrates the alignment of an example pair of image sensors by applying a time lag, according to one embodiment.
Figure 5A:
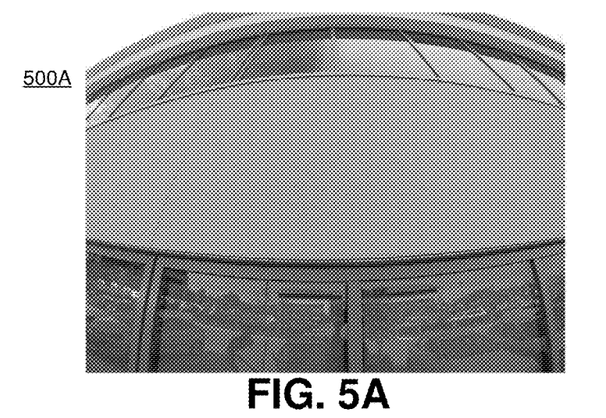
FIGS. 5A-5D illustrate example images illustrating edge detection used for determining a pixel shift, according to one embodiment.
Figure 5B:
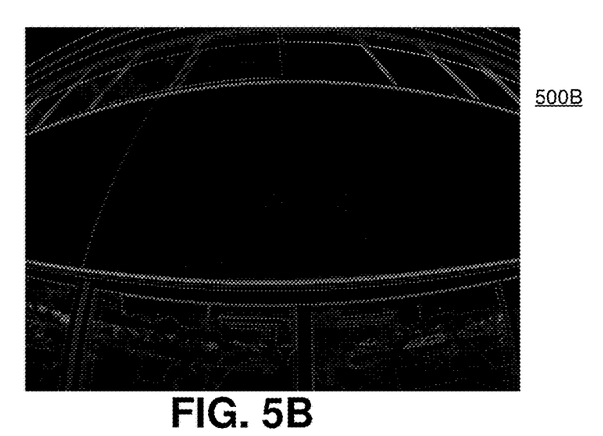
Figure 5C:
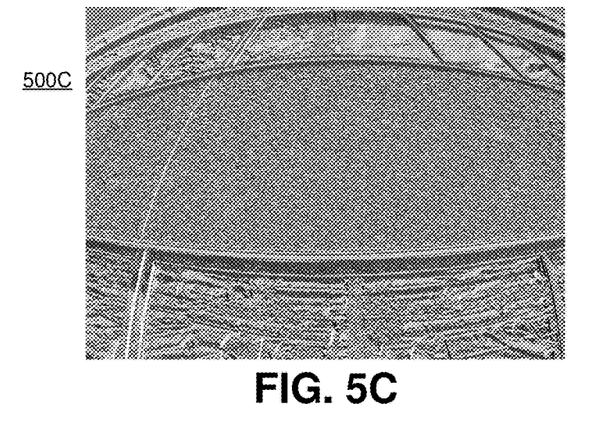
Figure 5D:
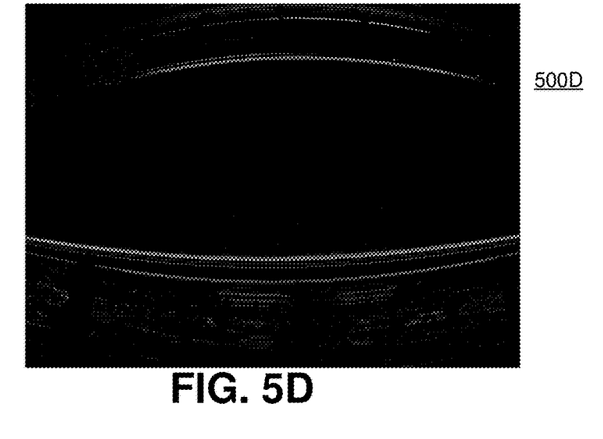

FIG. 4B illustrates the alignment of an example pair of image sensors 410 using a time lag, according to one embodiment. Each image sensor 410 includes a read window 420, which indicates the pixels in the image sensor 410 that are exposed to light and read out by the corresponding camera. In the illustrated example, the image sensors 410 capture image data from the top row of pixels of the read window 420 to the bottom row of pixels of the read window 420. The image sensors 410 capture light incident from a partially overlapping FOV, including the overlap region 425. The image sensors 410 also capture light incident from non-overlapping FOVs, including the regions 423, 427, and 429.

In the illustrated example, a delay time is applied to synchronize image capture according to a determined time lag (for instance, from the time lag determination module 330). As aligned, image sensors 410A and 410B have a different alignment in the rolling shutter direction. Due to the read window alignment, the image sensor 410B captures a row of pixels at an earlier time than a corresponding row of pixels having a similar height in image sensor 410A. To synchronize the image sensors 410, the capture controller 315 applies a time lag from the time lag determination module 330. The capture controller 315 initiates image capture by image sensor 410A. During the applied time lag, the image sensor 410A captures the pixels in regions 427A. After the passage of time equivalent to the time lag, the capture controller 315 initiates image capture by image sensor 410B, so the image sensors 410 capture corresponding rows of pixels in the image areas 423 and 425 at substantially the same time. The regions 423 and 425 from each image sensor can be stitched together to construct a 2D image, and the regions 425A and 425B, representing a common field of view, can be combined to create a 3D image. Further, the regions 427 and 429 contain pixel rows containing image data that do not correspond to a similar height in the captured image. If images 410A and 410B are combined into a rectangular 2D image, then the image data from regions 427 and 429 may be discarded.

Horizontal Edge Detection

FIGS. 5A-5D illustrate example images illustrating edge detection used for determining a pixel shift, according to one embodiment. Image 500A illustrates an image containing several substantially horizontal edges (e.g., window edges, window ledges). Image 500B illustrates edge magnitude information determined for the image 500A. The edge magnitude information can be, for instance, determined by the edge correlation module 325. In image 500B, image data having a relatively high edge magnitude is shown in white, and image data having a relatively low edge magnitude is shown in black. Image 500C illustrates edge phase determined for the image data from image 500A, for instance as determined by the edge correlation module 325. In image 500C, the direction of an edge corresponds to the color of that edge. Edges can be identified by analyzing neighboring pixels having a substantially similar color. Regions having no apparent edges appear to have random color.

Image 500D illustrates horizontal edges identified from the image data of image 500A using the edge magnitude data illustrated in image 500B and the edge phase data illustrated in image 500C. Image data corresponding to substantially horizontal edges are illustrated in white, and other image data are illustrated in black. The brightness or thickness of the identified horizontal edges corresponds to an identified edge's edge magnitude data. Some possible horizontal edges have been discarded in image 500D, for instance because the edge length for such edges is less than a length threshold.

In some embodiments, the edge extraction described herein can be applied to a calibration target used to align a pair of cameras. The calibration target is placed in the overlapping FOV of the cameras, and the cameras capture a pair of images of the calibration target to determine a pixel shift between the image sensors of the cameras. The calibration target can be any object suitable for determining a pixel shift between the image sensors of the cameras. Example calibration targets include a Quick Response or "QR" code, a Macbeth chart, or any other suitable marker. When used with the pixel shift determination methods described herein, a calibration target's edges may be aligned to be substantially perpendicular to the rolling shutter direction associated with the image sensors of the camera pair to improve pixel shift determination performance.

Aligning Image Sensors in a Multi-Camera System

Figure 6A:
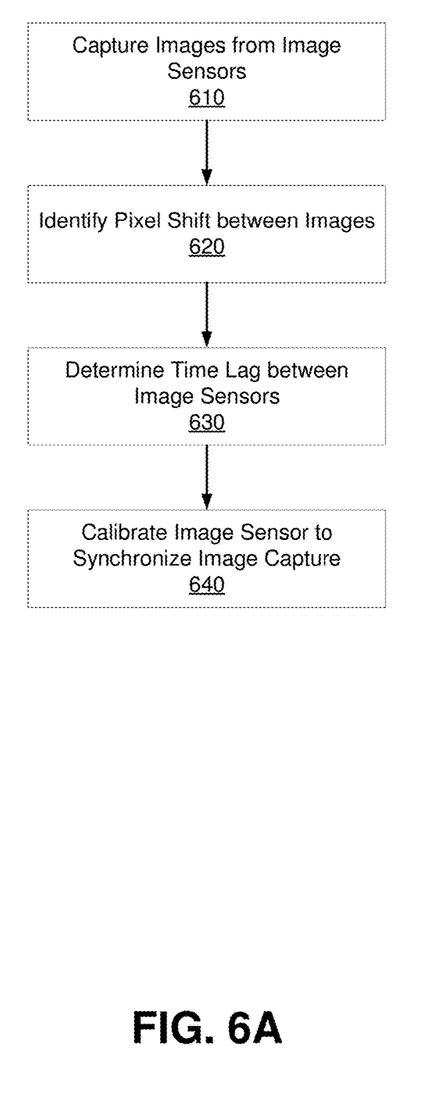
FIG. 6A illustrates a flow diagram of a process for aligning image sensors in a multi-camera system, according to one embodiment.

FIG. 6A illustrates a flow diagram of a process for aligning image sensors in a multi-camera system, according to one embodiment. A pair of image sensors captures 610 a pair of images at substantially a same time. The image sensors have an overlapping FOV, resulting in a portion of each captured image representing the overlapping FOV.

A pixel shift between the captured images is identified 620 based on image data of the pair of images representative of the common FOV. Identifying the pixel shift can include correlating the image data representative of the overlapping FOV. For example, to correlate the image data, at least one image is shifted by a number of pixels so that a measure of the difference between the pixel information of the portions of the images representative of the overlapping FOV is substantially reduced or minimized. The number of pixels used to shift the image that results in the measure of the difference between pixel information being substantially reduced or minimized is the identified pixel shift. Before correlating the captured image data, the image data of the images can be compressed and/or reduced, and the correlation can be determined based on the compressed or reduced image data. If the portions of the images representative of the overlapping FOV include a below-threshold amount of image data, one or more additional pairs of images having an overlapping FOV can be captured before identifying a pixel shift.

A time lag between the image sensors is determined 630 based on the identified pixel shift, for instance based on an amount of time required by an image sensor to capture a number of pixel lines corresponding to the pixel shift. At least one of the image sensors is calibrated 640 to substantially synchronize subsequent image capture by the image sensors. For example, the determined time lag is applied to at least one of the image sensors. If a first image sensor of the pair of image sensors lags a second image sensor of the pair of image sensors during image capture, then the first image sensor can initiate image capture, and the second image sensor can begin image capture after waiting for a period of time equal to the determined time lag. Alternatively or additionally, the read window of at least one of the image sensors can be adjusted by a number of pixels equal to the identified pixel shift, for instance in the rolling shutter direction or opposite the rolling shutter direction. For example, if a pixel shift of 3 pixel rows is identified, and a first image sensor lags a second image sensor, the first image sensor can adjust the read window of the first image sensor downward by 3 pixel rows such that the first image sensor captures a pixel row corresponding to a pixel row of the second image sensor at substantially the same time.

Figure 6B:
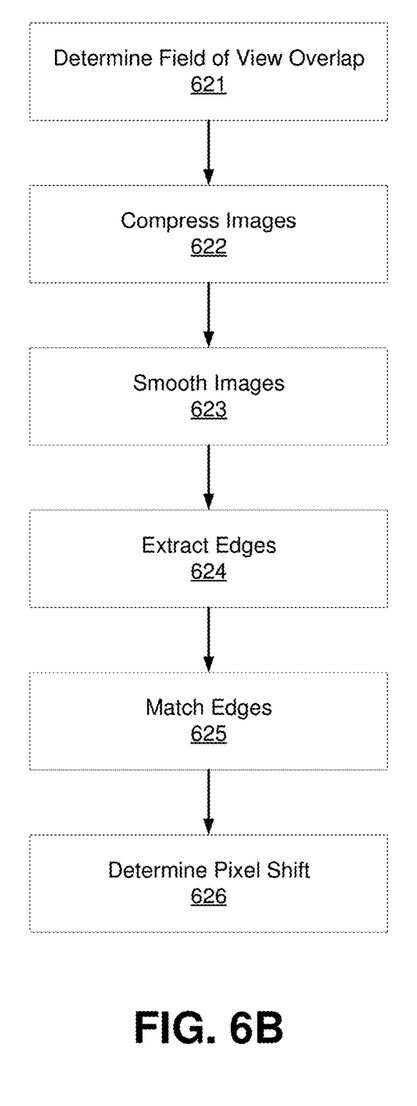
FIG. 6B illustrates a flow diagram of a process for determining a pixel shift between images having an overlapping field of view, according to one embodiment.

FIG. 6B illustrates a flow diagram of a process for determining a pixel shift between images having an overlapping FOV, according to one embodiment. A pair of images, including a first image and a second image, is captured at substantially the same time. The images include image data representative of an overlapping FOV. The portions of the images representing the overlapping FOV are determined 621 between the pair of images. The images, or the portions thereof representing the overlapping FOV, are compressed 622, for example by a downsampling factor. The portions of the images representing the overlapping FOV can also be cropped to remove image portions determined to be distorted due to a fisheye effect. The compressed images are smoothed 623, for example by convolving a Gaussian blur filter with the compressed image portions.

Edges within the smoothed image portions are extracted 624, for instance by determining edge magnitude information and edge phase information based on the luma components of the smoothed image portions. The extracted edges are matched 625, and a pixel shift is determined 626 for the pair of images based on the matched edges. As noted herein, the determined pixel shift can be used to align a pair of image sensors, or a time lag can be determined based on the pixel shift, and the time lag can be used to align the image sensors.

Additional Configuration Considerations

The disclosed embodiments beneficially allow for paired image sensors to calibrate themselves without manual calibration. By capturing the pair of images and determining a pixel shift between the images, the cameras can determine a calibration factor between them. Using a read window shift and/or a time lag on image capture, the cameras can use the determined pixel shift to correct the positional misalignment and/or lack of temporal synchronization between image sensors. As a result, image sensors capture image data of moving objects suitable for use in a combined 2D or 3D image without calibrating the camera's position by hand.

Certain embodiments are described herein as including logic or a number of components, modules, or mechanisms, for example, as illustrated in FIGS. 2 and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context. Further, unless expressly stated to the contrary, "or" refers to an inclusive or and not to an exclusive or.

Upon reading this disclosure, those of skill in the art will appreciate still additional alternative structural and functional designs for a system and a process for synchronizing multiple image sensors through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer-implemented method for determining a pixel shift between an image pair captured by image sensors, the method comprising:
    accessing a first image and a second image of the image pair, the first and second images comprising image data representative of an overlapping field of view between the image sensors;
    performing a smoothing operation on the first image and the second image to produce smoothed image data;
    determining edge magnitude data and edge phase data from the smoothed image data;
    identifying, by one or more processors, one or more edges in the image data based at least in part on the edge magnitude data and the edge phase data of the smoothed image data; and
    determining a pixel shift between the image pair by matching a first edge in the first image with a second edge in the second image using determined edge lengths for the identified one or more edges.

2. The method of claim 1, wherein identifying the one or more edges in the image data comprises:
    identifying a first set of smoothed image data having determined edge magnitude greater than an edge magnitude threshold;
    identifying a second set of smoothed image data having determined edge phase within a threshold of a target edge phase value; and
    identifying the one or more edges from image data in both the first set of smoothed image data and the second set of smoothed image data.

3. The method of claim 2, wherein the identified one or more edges are substantially perpendicular to a rolling shutter direction of the image sensors, and the target edge phase value corresponds to the rolling shutter direction.

4. The method of claim 1, wherein the image sensors have a rolling shutter direction, the method further comprising:
    before determining the edge magnitude data and edge phase data, compressing the first and second images perpendicular to the rolling shutter direction without compressing the first and second images along the rolling shutter direction.

5. The method of claim 1, wherein the first image and the second image are downsampled before the smoothing operation is performed.

6. The method of claim 1, further comprising cropping the first and second images by removing image data corresponding to outer borders of the first and second images prior to determining the edge magnitude data and the edge phase data.

7. The method of claim 1, further comprising calibrating the image sensors using the determined pixel shift.

8. A non-transitory computer readable medium comprising instructions for determining a pixel shift between an image pair captured by image sensors, the instructions executable by a processor, the instructions comprising instructions for:
    accessing a first image and a second image of the image pair, the first and second images comprising image data representative of an overlapping field of view between the image sensors;
    performing a smoothing operation on the first image and the second image to produce smoothed image data;
    determining edge magnitude data and edge phase data from the smoothed image data;
    identifying, by one or more processors, one or more edges in the image data based at least in part on the edge magnitude data and the edge phase data of the smoothed image data; and
    determining a pixel shift between the image pair by matching a first edge in the first image with a second edge in the second image using determined edge lengths for the identified one or more edges.

9. The computer-readable medium of claim 8, wherein identifying the one or more edges in the image data comprises:
    identifying a first set of smoothed image data having determined edge magnitude greater than an edge magnitude threshold;
    identifying a second set of smoothed image data having determined edge phase within a threshold of a target edge phase value; and
    identifying the one or more edges from image data in both the first set of smoothed image data and the second set of smoothed image data.

10. The computer-readable medium of claim 9, wherein the identified one or more edges are substantially perpendicular to a rolling shutter direction of the image sensors, and the target edge phase value corresponds to the rolling shutter direction.

11. The computer-readable medium of claim 8, wherein the image sensors have a rolling shutter direction, wherein the instructions further comprise instructions for:
    before determining the edge magnitude data and the edge phase data, compressing the first and second images perpendicular to the rolling shutter direction without compressing the first and second images along the rolling shutter direction.

12. The computer-readable medium of claim 8, wherein the instructions further comprise instructions for calibrating the image sensors using the determined pixel shift.

13. A camera system comprising at least one processor, an image sensor, and a non-transitory computer readable medium comprising instructions for determining a pixel shift between an image pair captured by image sensors including the image sensor, the instructions executable by the at least one processor, the instructions comprising instructions for:

accessing a first image and a second image of the image pair, the first and second images comprising image data representative of an overlapping field of view between the image sensors;

performing a smoothing operation on the first image and the second image to produce smoothed image data;

determining edge magnitude data and edge phase data from the smoothed image data;

identifying, by one or more processors, one or more edges in the image data based at least in part on the edge magnitude data and the edge phase data of the smoothed image data;

determining a pixel shift between the image pair by matching a first edge in the first image with a second edge in the second image using determined edge lengths for the identified one or more edges.

14. The camera system of claim 13, wherein identifying the one or more edges in the image data comprises:

identifying a first set of smoothed image data having determined edge magnitude greater than an edge magnitude threshold;

identifying a second set of smoothed image data having determined edge phase within a threshold of a target edge phase value; and identifying the one or more edges from image data in both the first set of smoothed image data and the second set of smoothed image data.

15. The camera system of claim 14, wherein the identified one or more edges are substantially perpendicular to a rolling shutter direction of the image sensors, and the target edge phase value corresponds to the rolling shutter direction.

16. The camera system of claim 13, wherein the image sensors have a rolling shutter direction, wherein the instructions further comprise instructions for:

before determining the edge magnitude data and the edge phase data, compressing the first and second images perpendicular to the rolling shutter direction without compressing the first and second images along the rolling shutter direction.

17. The camera system of claim 13, wherein the instructions further comprise instructions for calibrating the image sensors using the determined pixel shift.

* * * * *